(No Model.)

E. HILL.
Cylinder for Engines.

No. 240,708. Patented April 26, 1881.

WITNESSES.
Eugene N. Eliot
Thos. A. Connery

INVENTOR.
Ebenezer Hill
By Boyd Eliot
atty

UNITED STATES PATENT OFFICE.

EBENEZER HILL, OF SOUTH NORWALK, CONNECTICUT.

CYLINDER FOR ENGINES.

SPECIFICATION forming part of Letters Patent No. 240,708, dated April 26, 1881.

Application filed December 9, 1880. (No model.)

*To all whom it may concern:*

Be it known that I, EBENEZER HILL, of South Norwalk, in the county of Fairfield and State of Connecticut, have invented new and useful Improvements in Cylinders for Engines, of which the following is a specification.

This invention pertains to that class of engines that are technically termed "jacketed cylinders," or that have spaces between the interior and exterior faces of the cylinders for the circulation of water or the various gases that may be required to be either cooled or heated; and the invention consists in forming the cylinder proper with the required cavities or spaces on its interior surface for the desired circulation, but with ribs or studs in said cavities to serve as bearings for the inner lining of the jacket, then boring out the said cylinder or the inner faces of said ribs or studs to the required diameter, or as much less than the thickness of the lining, and then forming a lining of thin sheet metal of nearly the required diameter of the said bore, so that it may be easily shoved into the cylinder, and then rolling said lining into contact with the said ribs or supports, as will hereinafter appear.

Figure 1:
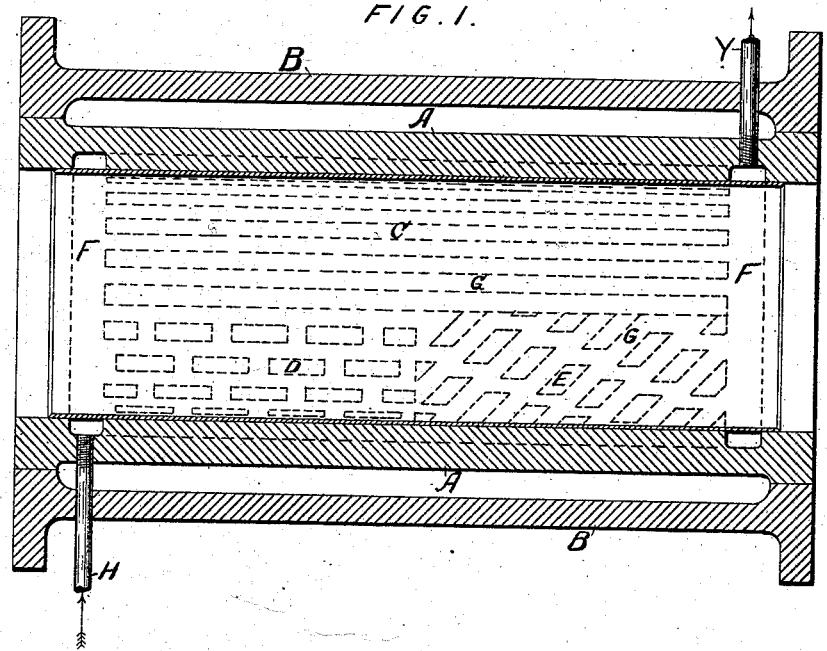
Figure 2:
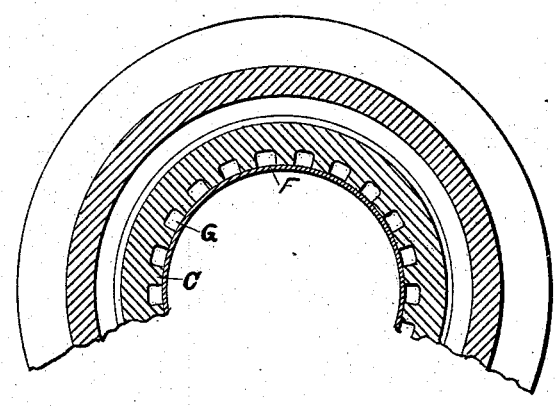

In the drawings, Figure 1 represents a longitudinal section of a cylinder without the heads. Fig. 2 is a partial cross-section of the same.

At A is represented a portion of a cylinder, which may be used either for water, air, or the various gases, and in this case there is provided an exterior cylinder, as at B, upon which may be cast all the seats, and for connections, &c., so that the interior one may be removed and rebored and relined without disturbing the connections other than removing the heads.

Upon the inner face of the cylinder A are formed ribs, extending the entire length of the jacketed chamber, as at C, and with spaces between them to give the required circulation or to form the jacket-chamber; or, in place of said ribs, studs or projections as alternated pieces of ribs may be cast upon the interior of the said cylinder, as at D; or they may be arranged spirally in sections, as at E, Fig. 1, or other convenient form to serve as supports for the lining, which is shown at F. After the said cylinder A is cast with either or any of the said kind of projections, it is then bored out—that is, the inner faces of these ribs or studs are dressed or bored to a certain diameter. Then a lining, as at F, of thin sheet metal, as copper, brass, &c., is formed of nearly the interior diameter and then brazed at its edges, and is then shoved into the said cylinder, and then a boring-bar with a roller of considerable surface is introduced into the interior, and the said lining is thereby rolled or forced outward until it bears upon the said ribs or studs, and thereby forms a fixed lining for the cylinder, and also an inner wall or facing for the jacket. If the said spaces between the ribs or studs, as at G, are required to be of such considerable size that the lining, under the rolling action, will be forced into them, they may be filled with some alloy, as spelter, and bored out at the same time the ribs or studs are faced, and after the lining has been rolled in place the said filling may be melted out, and thus the lining may be left smooth for the piston. If, however, it is desirable to have a very thin lining for the transmission of either heat or cold, the ribs and spaces may be made very small and extend longitudinally through the cylinder, and then the lining may be rolled in with a small rolling-surface, thereby forming small grooves between the ribs, and thus making the inner surface of the cylinder slightly fluted or corrugated, in which case a soft packing for the piston may be used, or the metal packing-rings may be fitted to it.

It is evident that some other substance than spelter may be used to fill the said grooves or spaces, and that a plastic substance may be used and then dissolved or driven out, instead of being melted, when they are required to be filled.

It is also evident that the exterior cylinder, B, may be dispensed with and the attachments may all be made upon the single cylinder, as at A, to which the tubes for the inlet and exit of the substances passing through the jacketed spaces may be attached, as shown at X and Y.

I therefore claim—

1. A jacketed cylinder, either for water, steam, air, or other gases, formed with ribs or studs in the jacketed space or spaces, and faced and covered with a thin sheet-metal lining, rolled into proper position, as hereinbefore set forth.

2. The method of lining jacketed cylinders, consisting of forming bearing ribs or studs in the jacketed spaces, then filling the intervening grooves or spaces with an alloy or other hard bearing substance, then boring out the cylinder, and lastly rolling in a thin sheet-metal lining, as hereinbefore set forth.

In testimony whereof I have hereunto set my hand and seal in the presence of two subscribing witnesses.

EBENEZER HILL. [L. S.]

Witnesses:
 LE ROY ADAMS,
 JACOB M. LAYTON.